(12) United States Patent
Balasubramanian et al.

(10) Patent No.: US 11,308,810 B2
(45) Date of Patent: Apr. 19, 2022

(54) SIDELINK BASED VEHICLE-TO-PEDESTRIAN SYSTEM

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Shailesh Patil, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/908,495

(22) Filed: Jun. 22, 2020

(65) Prior Publication Data

US 2020/0402404 A1    Dec. 24, 2020

Related U.S. Application Data

(60) Provisional application No. 62/865,791, filed on Jun. 24, 2019.

(51) Int. Cl.
*G08G 1/16*  (2006.01)
*H04W 72/04*  (2009.01)
*H04W 4/40*  (2018.01)

(52) U.S. Cl.
CPC .............. *G08G 1/166* (2013.01); *H04W 4/40* (2018.02); *H04W 72/0406* (2013.01)

(58) Field of Classification Search
None
See application file for complete search history.

(56) References Cited

U.S. PATENT DOCUMENTS 10,455,370 B2  10/2019  Park et al.
2018/0295481 A1  10/2018  Kahtava et al.
(Continued)

FOREIGN PATENT DOCUMENTS

DE  102010003429 A1  10/2011
DE  102012211172 A1  4/2014
WO  WO-2018016713 A2  1/2018

OTHER PUBLICATIONS

Muller F: "Where is your Guardian Angel?—Locating and Protecting Vulnerable Road Users", Institute of Communications and Navigation, Lelystad, Netherlands, Nov. 20, 2018, 24 Pages.
(Continued)

*Primary Examiner* — Adolf Dsouza
(74) *Attorney, Agent, or Firm* — Danai Nelisile Mhembere; Holland & Hart LLP

(57) ABSTRACT

Methods, systems, and devices for wireless communications are described. A user equipment (UE) carried by a pedestrian (e.g., a P-UE) may receive control signaling that indicates a resource allocation for a sidelink channel for pedestrian to vehicle communications. The P-UE may transmit, within the resource allocation of the sidelink channel, a message that includes an identifier of the P-UE based on movement data of the P-UE being classified as pedestrian movement. The P-UE may monitor the sidelink channel for a collision warning message from a vehicle UE that includes the identifier of the P-UE based on transmitting the message. If the P-UE receives a collision warning message that includes its identifier, the P-UE may present an alert based on receiving the collision warning message.

30 Claims, 12 Drawing Sheets

(56) References Cited

U.S. PATENT DOCUMENTS

2019/0289462 A1* 9/2019 Kim .................. H04W 12/0471
2020/0059813 A1 2/2020 Park et al.

OTHER PUBLICATIONS

"3 Generation Partnership Project; Technical Specification Group Services and System Aspects; Study on LTE support for Vehicle to Everything (V2X) services (Release 14)", 3GPP Standard, 3GPP TR 22.885, 3rd Generation Partnership Project (3GPP), Mobile Competence Centre, 650, Route Des Lucioles, F-06921 Sophia-Antipolis Cedex, France, vol. SA WG1, No. V14.0.0, Dec. 21, 2015 (Dec. 21, 2015), pp. 1-50, XP051047150, [retrieved on Dec. 21, 2015], Section 4.4, Section 5.17 and Subsections, Section 5.18 and Subsections, Section 5.22 and Subsections.
Fujitsu: "Discussion on Power Saving for V2P Communications", 3GPP Draft, 3GPP TSG-RAN WG2 Meeting#95b, R2-166489 Discussion on Power Saving for V2P Communications, 3rd Generation Partnership Project (3GPP), Mobile Competence Centre, 650, Route Des Lucioles, F-06921 Sophia-Antipolis Cedex, vol. RAN WG2, No. Kaohsiung, Oct. 10, 2016-Oct. 14, 2016, Oct. 9, 2016 (Oct. 9, 2016), XP051151005, pp. 1-2, Retrieved from the Internet: URL: http://www.3gpp.org/ftp/Meetings_3GPP_SYNC/RAN2/Docs/, [retrieved on Oct. 9, 2016], Section 2.
International Search Report and Written Opinion—PCT/US2020/039206—ISAEPO—dated Aug. 25, 2020 (193167WO).
Zte, et al., "Considerations on NR V2X", 3GPP Draft, 3GPP TSG RAN WG3 Meeting #102, R3-186422 Considerations on NR V2X, 3rd Generation Partnership Project (3GPP), Mobile Competence Centre, 650, Route Des Lucioles, F-06921 Sophia-Antipolis Cedex, France vol. RAN WG3, No. Spokane, USA, Nov. 12, 2018-Nov. 16, 2018, Nov. 11, 2018 (Nov. 11, 2018), XP051558214, 3 Pages, Retrieved from the Internet: URL: http://www.3gpp.org/ftp/Meetings%5F3GPP%5FSYNC/RAN3/Docs/R3%2D186422%2Ezip, [retrieved on Nov. 11, 2018], Sections 2.1 and 2.3.

* cited by examiner

SIDELINK BASED VEHICLE-TO-PEDESTRIAN SYSTEM

CROSS REFERENCE

The present application for patent claims the benefit of U.S. Provisional Patent Application No. 62/865,791 by BALASUBRAMANIAN et al., entitled "SIDELINK BASED VEHICLE-TO-PEDESTRIAN SYSTEM," filed Jun. 24, 2019, assigned to the assignee hereof, and expressly incorporated by reference herein.

FIELD OF TECHNOLOGY

The following relates generally to wireless communications and more specifically to sidelink based vehicle-to-pedestrian (V2P) system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support direct communications between multiple communication devices. Examples of direct communications may include, but are not limited to, device-to-device (D2D) communications, vehicle-based communications, which may also be referred to as V2P networks, vehicle-to-everything (V2X) networks, vehicle-to-vehicle (V2V) networks, cellular V2X (C-V2X) networks, and the like. As demand for communication efficiency increases, some wireless communications systems may fail to provide satisfactory power management, and therefore improved techniques are desired.

SUMMARY

The described techniques relate to improved methods, systems, devices, and apparatuses that support sidelink based vehicle-to-pedestrian (V2P) system. Generally, the described techniques provide for presenting a pedestrian with a warning of a projected collision with a vehicle. Wireless communication systems described herein may support direct communications between multiple communication devices or user equipment (UEs), such as V2P wireless communications. In V2P wireless communication systems, device-to-device communications may occur between a vehicle, also referred to as a V-UE, and a UE carried by a pedestrian, also referred to as P-UE. Some V2P wireless communications systems may support a sidelink channel, such as via a PC5 interface, for V-UEs and P-UEs to exchange V2P and P2V messages.

The V2P wireless communications systems described herein may support efficiently warning a P-UE of a projected collision with a V-UE. For example, the P-UE may determine whether the carrying user is moving according to a movement profile of a pedestrian (e.g., walking, running, biking, etc.) using various sensors of the P-UE. The P-UE may determine the pedestrian movement profile based on characteristics of the pedestrian which may be measured by the sensors, such as the pedestrian's gait, speed, direction of movement, limb movement or swing, among others. If the P-UE is traveling in one of those pedestrian movement profiles, the P-UE may generate a message which is to be broadcasted to nearby vehicles on the sidelink channel. The message generated by the P-UE may include an identifier for the P-UE, a location of the P-UE, an indicator of the intent of the pedestrian (e.g., trajectory), or any combination thereof.

Nearby V-UEs may monitor for messages from P-UEs. A V-UE may receive a message from a P-UE on a sidelink and determine whether the P-UE is projected to collide with the V-UE. The collision projections may be determined based on the information included in the messages sent by the P-UE, vision measurements, radar measurements, or any combination thereof. If the V-UE is projected to be on a collision course with a P-UE, the V-UE may generate a collision warning message that includes the identifier of the at-risk P-UE and transmit the collision warning message on the sidelink channel. The P-UE may receive the collision warning message on the sidelink channel and present an alert (e.g., on a display of the P-UE, via vibration, or using audio cues) if the collision warning message carries the identifier of the P-UE. The alert may inform the pedestrian of the projected collision with the V-UE so that the pedestrian can act to avoid the collision. If the collision warning message does not include the identifier for the P-UE, the P-UE may discard the collision warning message.

A method of wireless communications by a UE is described. The method may include receiving control signaling that indicates a resource allocation for a sidelink channel for pedestrian to vehicle communications, transmitting, within the resource allocation of the sidelink channel, a message that includes an identifier of the UE based on movement data of the UE being classified as pedestrian movement, and monitoring the sidelink channel for a collision warning message from a vehicle UE that includes the identifier of the UE based on transmitting the message.

An apparatus for wireless communications by a UE is described. The apparatus may include a processor, memory coupled with the processor, and instructions stored in the memory. The instructions may be executable by the processor to cause the apparatus to receive control signaling that indicates a resource allocation for a sidelink channel for pedestrian to vehicle communications, transmit, within the resource allocation of the sidelink channel, a message that includes an identifier of the UE based on movement data of the UE being classified as pedestrian movement, and monitor the sidelink channel for a collision warning message from a vehicle UE that includes the identifier of the UE based on transmitting the message.

Another apparatus for wireless communications by a UE is described. The apparatus may include means for receiving control signaling that indicates a resource allocation for a sidelink channel for pedestrian to vehicle communications, transmitting, within the resource allocation of the sidelink channel, a message that includes an identifier of the UE based on movement data of the UE being classified as pedestrian movement, and monitoring the sidelink channel for a collision warning message from a vehicle UE that includes the identifier of the UE based on transmitting the message.

A non-transitory computer-readable medium storing code for wireless communications by a UE is described. The code may include instructions executable by a processor to receive control signaling that indicates a resource allocation for a sidelink channel for pedestrian to vehicle communications, transmit, within the resource allocation of the sidelink channel, a message that includes an identifier of the UE based on movement data of the UE being classified as pedestrian movement, and monitor the sidelink channel for a collision warning message from a vehicle UE that includes the identifier of the UE based on transmitting the message.

In some examples of the method, apparatuses, and non-transitory computer-readable medium described herein, transmitting the message may include operations, features, means, or instructions for transmitting the message including location data of the UE, trajectory data of the UE, or both.

In some examples of the method, apparatuses, and non-transitory computer-readable medium described herein, monitoring the sideband channel may include operations, features, means, or instructions for monitoring a vehicle to pedestrian resource pool of the sidelink channel for the collision warning message.

In some examples of the method, apparatuses, and non-transitory computer-readable medium described herein, transmitting the message may include operations, features, means, or instructions for transmitting the message including the identifier that may be a pseudo identifier of the UE.

In some examples of the method, apparatuses, and non-transitory computer-readable medium described herein, transmitting the message may include operations, features, means, or instructions for transmitting the message including a packet that includes a pseudo identifier of the UE as a source identifier of the packet, and a broadcast identifier as a destination identifier of the packet.

Some examples of the method, apparatuses, and non-transitory computer-readable medium described herein may further include operations, features, means, or instructions for receiving the collision warning message that includes an identifier of a second UE that may be different from the UE, and discarding the collision warning message.

Some examples of the method, apparatuses, and non-transitory computer-readable medium described herein may further include operations, features, means, or instructions for receiving the collision warning message that includes the identifier of the UE, and presenting an alert based on receiving the collision warning message.

In some examples of the method, apparatuses, and non-transitory computer-readable medium described herein, the alert may be an audible alert, a displayed alert, or both.

Some examples of the method, apparatuses, and non-transitory computer-readable medium described herein may further include operations, features, means, or instructions for determining that a second identifier included as a destination identifier in the collision warning message matches the identifier of the UE.

Some examples of the method, apparatuses, and non-transitory computer-readable medium described herein may further include operations, features, means, or instructions for classifying the movement data as being pedestrian movement based on the movement data corresponding to a pedestrian movement profile of a set of different movement profiles.

Some examples of the method, apparatuses, and non-transitory computer-readable medium described herein may further include operations, features, means, or instructions for monitoring at least one sensor of the UE, and determining a movement parameter based on the monitoring, where the movement data of the UE may be classified as the pedestrian movement based on the movement parameter.

In some examples of the method, apparatuses, and non-transitory computer-readable medium described herein, the movement parameter may be a gait parameter, a speed parameter, a direction parameter, a limb movement parameter, or any combination thereof.

In some examples of the method, apparatuses, and non-transitory computer-readable medium described herein, transmitting the message may include operations, features, means, or instructions for transmitting the message via the sidelink channel using a sidelink interface of the UE.

A method of wireless communications by a vehicle UE is described. The method may include receiving control signaling that indicates a resource allocation for a sidelink channel for vehicle to pedestrian communications, receiving, within the resource allocation for the sidelink channel, a message that includes an identifier of a first UE and location data of the first UE, and transmitting, via the sidelink channel, a collision warning message including the identifier of the first UE based on a collision predicted with the first UE using the location data.

An apparatus for wireless communications by a vehicle UE is described. The apparatus may include a processor, memory coupled with the processor, and instructions stored in the memory. The instructions may be executable by the processor to cause the apparatus to receive control signaling that indicates a resource allocation for a sidelink channel for vehicle to pedestrian communications, receive, within the resource allocation for the sidelink channel, a message that includes an identifier of a first UE and location data of the first UE, and transmit, via the sidelink channel, a collision warning message including the identifier of the first UE based on a collision predicted with the first UE using the location data.

Another apparatus for wireless communications by a vehicle UE is described. The apparatus may include means for receiving control signaling that indicates a resource allocation for a sidelink channel for vehicle to pedestrian communications, receiving, within the resource allocation for the sidelink channel, a message that includes an identifier of a first UE and location data of the first UE, and transmitting, via the sidelink channel, a collision warning message including the identifier of the first UE based on a collision predicted with the first UE using the location data.

A non-transitory computer-readable medium storing code for wireless communications by a vehicle UE is described. The code may include instructions executable by a processor to receive control signaling that indicates a resource allocation for a sidelink channel for vehicle to pedestrian communications, receive, within the resource allocation for the sidelink channel, a message that includes an identifier of a first UE and location data of the first UE, and transmit, via the sidelink channel, a collision warning message including the identifier of the first UE based on a collision predicted with the first UE using the location data.

In some examples of the method, apparatuses, and non-transitory computer-readable medium described herein, receiving the message may include operations, features, means, or instructions for receiving the message that includes trajectory data of the first UE, where the collision may be predicted based on the trajectory data.

In some examples of the method, apparatuses, and non-transitory computer-readable medium described herein, receiving the message may include operations, features, means, or instructions for receiving the message that includes trajectory data of the first UE, movement data of the first UE, or both, where the collision may be predicted based on a gait parameter, a speed parameter, a direction parameter, a limb movement parameter, or any combination thereof.

In some examples of the method, apparatuses, and non-transitory computer-readable medium described herein, transmitting the collision warning message may include operations, features, means, or instructions for transmitting the collision warning message including the identifier of the first UE as a destination identifier in the collision warning message.

In some examples of the method, apparatuses, and non-transitory computer-readable medium described herein, transmitting the collision warning message may include operations, features, means, or instructions for transmitting the collision warning message via the sidelink channel using a sidelink interface of the vehicle UE.

Some examples of the method, apparatuses, and non-transitory computer-readable medium described herein may further include operations, features, means, or instructions for altering a speed of a vehicle that includes the vehicle UE, a trajectory of the vehicle, or both, based on the predicting.

Some examples of the method, apparatuses, and non-transitory computer-readable medium described herein may further include operations, features, means, or instructions for generating an alert based on the predicting.

Some examples of the method, apparatuses, and non-transitory computer-readable medium described herein may further include operations, features, means, or instructions for receiving a second message that includes an identifier of a second UE and location data of the second UE, predicting that the vehicle UE may be not on a collision course with the second UE based on the second message, and determining not to transmit a second collision warning message that includes the identifier of the second UE based on the predicting.

DETAILED DESCRIPTION

Figure 1:
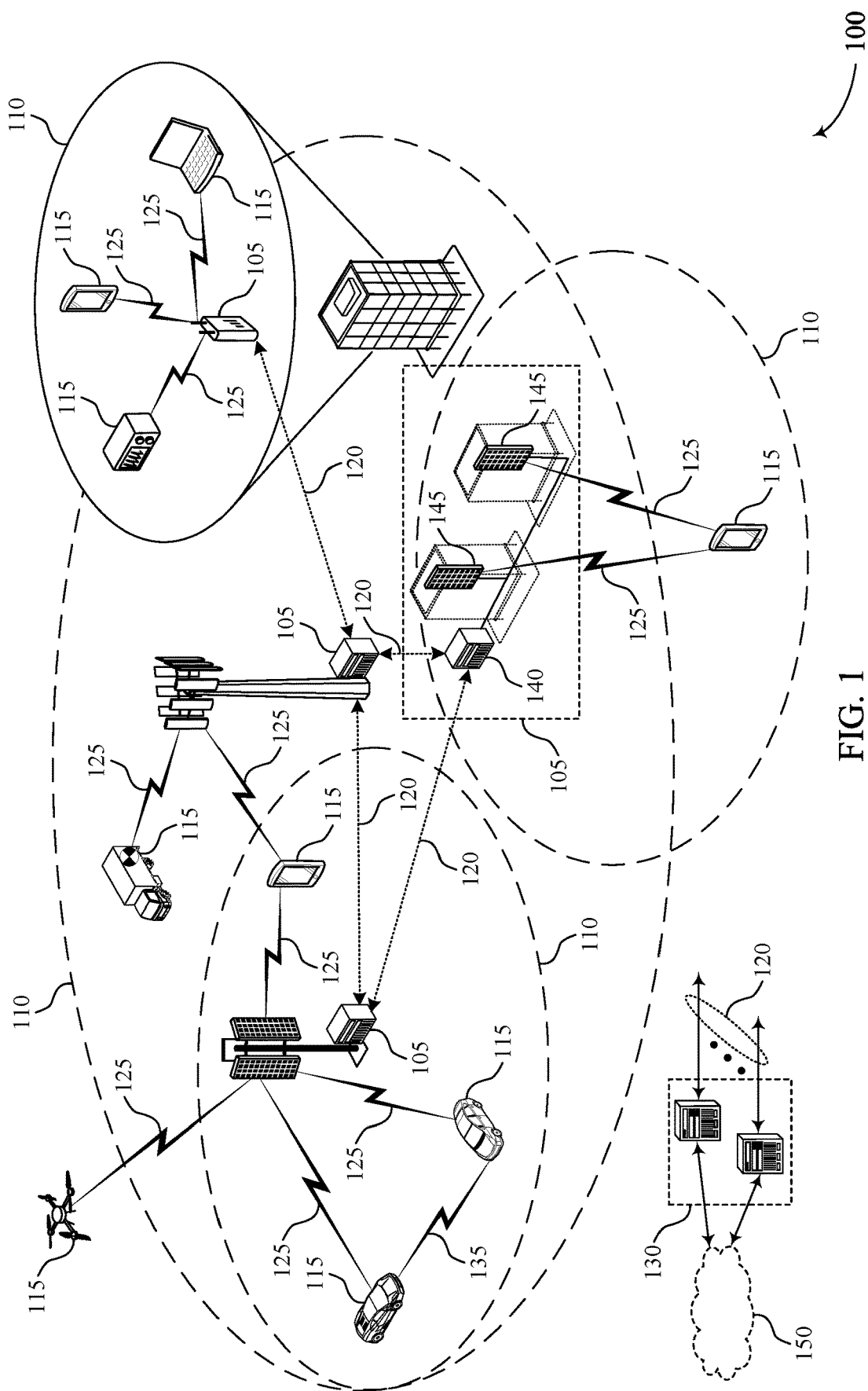
FIG. 1 illustrates an example of a system for wireless communications in accordance with aspects of the present disclosure.

Some wireless communication systems may support direct communications between multiple communication devices, which may be otherwise known as user equipment (UEs). Examples of direct communications may include device-to-device (D2D) communications, which may include vehicle-based communications such as vehicle-to-pedestrian (V2P) wireless communication systems and the like. In V2P wireless communication systems, D2D communications may occur between a vehicle (also referred to as "V-UE") and a UE carried by a pedestrian (also referred to as "P-UE"). Some wireless communications systems may support communications between vehicles and other devices. For example, some wireless communications systems may support vehicle to vehicle (V2V) communications, V2P communications, or vehicle to everything (V2X) communications. Direct communications between a V-UE and P-UE may occur over a direct connection, which may be a sidelink connection, such as via a PC5 interface. V-UEs and P-UEs may therefore exchange information via V2P messages and pedestrian-to-vehicle (P2V) messages using the PC5 interface.

Some vehicle-based wireless communication systems may have shortcomings in addressing road safety, and more specifically improving pedestrian safety via direct communications. In some examples, to address pedestrian safety, P-UEs may continuously monitor a sidelink (e.g., PC5 interface) for messages (e.g., warning messages) from V-UEs. However, continuously monitoring the sidelink by the P-UEs may result in increased power consumption, for example, due to the PC5 interface receive circuitry operating nonstop. Due to finite resources (e.g., battery life) of P-UEs, improving pedestrian safety in V2P wireless communication systems, while simultaneously minimizing the power consumption, may be challenging. Therefore, as demand for communication efficiency and improvements to pedestrian safety in V2P wireless communication systems increases, improvements to power management for P-UEs may be desired.

Techniques for efficiently warning a P-UE of a projected collision with a V-UE are described herein. The P-UE may determine whether the carrying user is moving according to a movement profile of a pedestrian. For example, the P-UE may use sensors on the device to determine whether the pedestrian is walking, running, biking, etc., and when the pedestrian is near a road. The P-UE may determine the pedestrian movement profile based on characteristics of the pedestrian which may be measured by the sensors, such as the pedestrian's gait, speed, direction of movement, limb movement or swing, among others. If the P-UE is traveling in one of those pedestrian movement profiles, the P-UE may generate a message which is to be broadcasted to nearby vehicles on the sidelink channel. The message generated by the P-UE may include an identifier for the P-UE, a location of the P-UE, an indicator of the intent of the pedestrian (e.g., trajectory), or any combination thereof. The indicator of the intent may convey a mode of travel of the P-UE or movement information for the P-UE which may be based on the sensor measurements.

Nearby V-UEs may monitor for messages from P-UEs. For example, a V-UE may receive messages from multiple P-UEs, and each may contain a P-UE identifier, location, and intent. The V-UE may determine whether any of the P-UEs are projected to collide with the V-UE. The collision projections may be determined based on the information included in the messages, vision measurements, radar measurements, or any combination thereof. If the V-UE is on a collision course with a P-UE, the V-UE may generate a collision warning message that includes the identifier of the P-UE and may include an indication that the P-UE and the V-UE are projected to collide. The V-UE may then transmit the collision warning message with the identifier of the P-UE of interest on the sidelink channel. The P-UE may receive the collision warning message on the sidelink channel and check whether the message includes the identifier of the P-UE. If the collision warning message is intended for the P-UE, the P-UE may present an alert (e.g., on a display of the P-UE, via vibration, or using audio cues). This may inform the pedestrian of the projected collision with the V-UE so that the pedestrian can take action to avoid the collision. If the collision warning message does not include the identifier for the P-UE, the P-UE may discard the collision warning message (e.g., as the collision warning message may be intended for a different P-UE).

Aspects of the disclosure are initially described in the context of wireless communications systems. Aspects of the disclosure are further illustrated by and described with reference to apparatus diagrams, system diagrams, and flowcharts that relate to sidelink based V2P system.

FIG. 1 illustrates an example of a wireless communications system 100 that supports sidelink based V2P system in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both. In some examples, UEs 115 may be P-UEs 115 or V-UEs 115, or a combination thereof.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications systems 100 may support efficiently warning a UE 115 carried by a pedestrian (e.g., a P-UE) of a projected collision with a vehicle (e.g., a vehicle which may include some aspects of a UE 115, or a V-UE). For example, the P-UE may determine whether the pedestrian is moving according to a certain movement profile, such as walking, running, or biking, using various sensors of the device. The P-UE may determine the pedestrian movement profile based on characteristics of the pedestrian which may be measured by the sensors, such as the pedestrian's gait, speed, direction of movement, limb movement or swing, among others. If the P-UE is traveling in one of those pedestrian movement profiles, the P-UE may generate a message which is to be broadcasted to nearby vehicles on the sidelink channel, which may be an example of a D2D communication link 135 between V-UEs and P-UEs. The message generated by the P-UE may include an identifier for the P-UE, a location of the P-UE, an indicator of the intent of the pedestrian, or any combination thereof.

Nearby V-UEs may monitor for messages from P-UEs. A V-UE may receive a message from a P-UE on a sidelink and determine whether the P-UE is projected to collide with the V-UE. The collision projections may be determined based on the information included in the messages, vision measurements, radar measurements, or any combination thereof. If the V-UE is on a collision course with a P-UE, the V-UE generate a collision warning message using the identifier of the P-UE and transmit the collision warning message on the sidelink channel. The P-UE may receive the collision warning message on the sidelink channel and present an alert (e.g., on a display of the P-UE, via vibration, or using audio cues) if the collision warning message carries the identifier of the P-UE. The alert may inform the pedestrian of the projected collision with the V-UE so that the pedestrian can act to avoid the collision. If the collision warning message does not include the identifier for the P-UE, the P-UE may discard the collision warning message.

Figure 2:
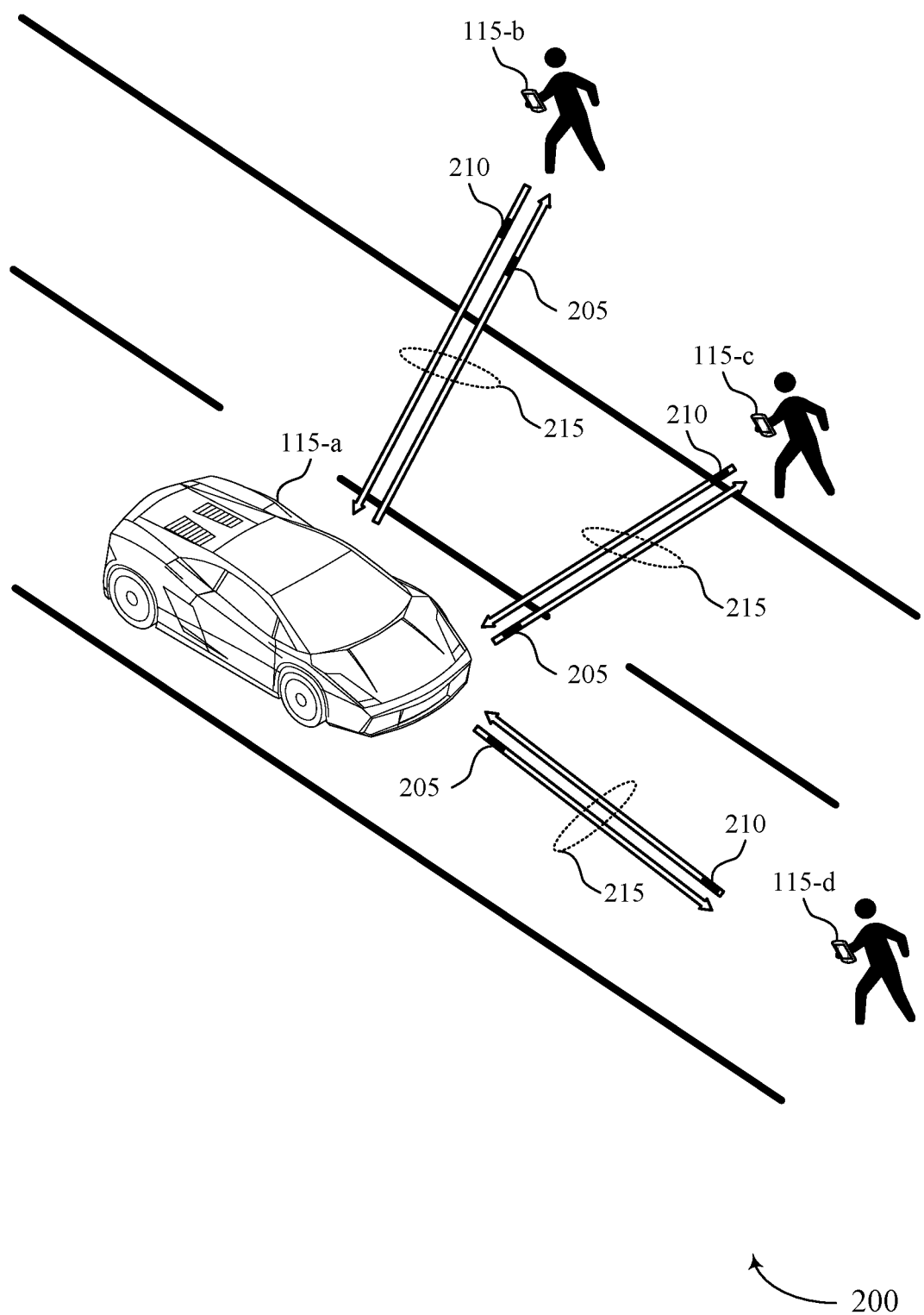
FIG. 2 illustrates an example of a V2P wireless communications system in accordance with aspects of the present disclosure.

FIG. 2 illustrates an example of a V2P wireless communications system 200 that supports sidelink based V2P system in accordance with aspects of the present disclosure. In some examples, V2P wireless communications system 200 may implement aspects of wireless communication system 100. The V2P wireless communications system 200 may include multiple UEs 115, which may be examples of the corresponding devices described with reference to FIG. 1. For example, UE 115-a may be a V-UE while UE 115-b, UE 115-c and UE 115-d may each be an example of a P-UE (e.g., a UE 115 carried by a pedestrian). In some examples, the V2P wireless communications system 200 may implement aspects of the wireless communications system 100. For example, UEs 115 in the V2P wireless communications system 200 may address road safety, and more specifically improve pedestrian safety via direct communications between UEs 115 in the V2P wireless communication systems 200 by exchanging information, for example V2P messages 205 and P2V messages 210 via PC5 interfaces 215.

In some examples, to experience these benefits (e.g., road safety, pedestrian safety), UEs 115 in the V2P wireless communications system 200 may support improvements to UE 115 power usage (e.g., minimizing power consumption), among other advantages. For UEs 115 to experience advantages such as power improvements, UEs 115 may in some examples implement techniques to provide improved PC5 power operation for UEs 115. For example, a P-UE (e.g., UE 115-b, UE 115-c, UE 115-d) may broadcast messages on the PC5 interface 215 (e.g., a sidelink channel), which may be received at a V-UE (e.g., UE 115-a) as part of a vehicle-and-pedestrian collision prediction technique. The P-UE messages may include movement data for the P-UE, a location of the P-UE, and an identifier for the P-UE. A V-UE may receive the P-UE messages and determine whether the P-UE and the V-UE are projected to collide. If the P-UE and the V-UE are predicted to collide, the V-UE may send a collision warning message to the P-UE, which may prompt an alert at the P-UE. This gives the pedestrian a warning so that the pedestrian can avoid colliding with the V-UE. An exemplary sidelink channel communications exchange for vehicle-and-pedestrian collision detection and prevention is further described in more detail herein with reference to FIG. 3. In some cases, a vehicle-to-pedestrian resource pool of a sidelink channel may be configured for transmission of one or more collision warning messages by the V-UE, and the P-UE may monitor the vehicle-to-pedestrian resource pool for a collision warning message. For example, a base station 105 may configure the vehicle-to-pedestrian resource pool for use by a V-UE and one or more P-UEs. Similarly, the base station 105 may configure a pedestrian-to-vehicle resource pool for pedestrians to transmit its identity, location, intent, and sensor information to vehicles.

Figure 3:
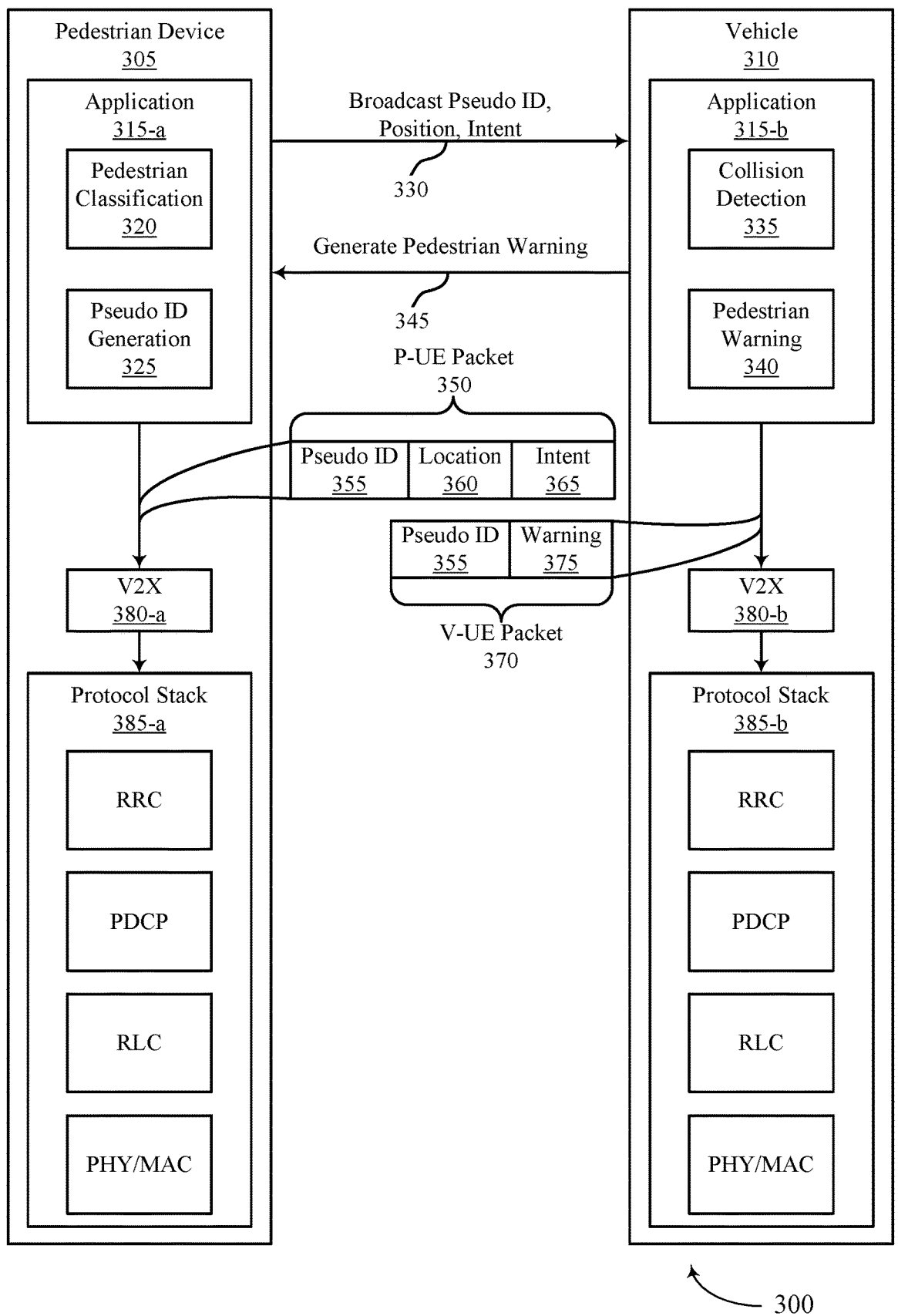
FIG. 3 illustrates an example of a sidelink channel communications exchange in accordance with aspects of the present disclosure.

FIG. 3 illustrates an example of a sidelink channel communications exchange 300 that supports sidelink based V2P system in accordance with aspects of the present disclosure. In some examples, sidelink channel communications exchange 300 may implement aspects of wireless communication system 100.

Generally, the sidelink channel communications exchange 300 describes communications between a pedestrian device 305 and a vehicle 310 on a sidelink between the pedestrian device 305 and the vehicle 310. The pedestrian device 305 may be an example of a P-UE 115 as described with reference to FIG. 2. In some cases, the pedestrian device 305 may refer to a device, such as a UE 115, which is owned, operated, or carried by, or in close proximity to, the pedestrian (e.g., a user). For example, the pedestrian device 305 may refer to a UE 115 or mobile device held by a person, in a pocket or backpack of the person, etc. The vehicle 310 may refer to an autonomous or self-driving vehicle, a human-operated vehicle, or a vehicle which includes aspects of both. For example, the vehicle 310 may include aspects of UE 115-a or a V-UE 115 as described with reference to FIG. 2.

The sidelink channel may be configured for direct or indirect communications between the pedestrian device 305 and the vehicle 310. For example, in some cases, signaling may be communicated directly between the pedestrian device 305 and the vehicle 310. Additionally, or alternatively, the signaling may be communicated between the pedestrian device 305 and the vehicle 310 via a relay point, such as a base station 105. The sidelink channel may be an example of a PC5 interface 215 as described with reference to FIG. 2.

In some cases, the pedestrian device 305 may be configured with a resource allocation for the sidelink channel for pedestrian to vehicle communications. For example, the pedestrian device 305 may be configured with the resource allocation so the pedestrian device 305 can power sidelink communications components during the resource allocation and, in some cases, reduce power to the sidelink communications components between the resource allocations. Configuring the sidelink resources may improve power saving performance at the pedestrian device 305, as the pedestrian device may not have to maintain power to the sidelink circuitry to monitor for sidelink messages with warnings. Instead, the pedestrian device may power the sidelink circuitry for the sidelink resource allocation.

The pedestrian device 305 and the vehicle 310 may each store an application 315. In some cases, the application 315 may run as a background process in each of the devices. In some examples, the application 315 may generate packets which are transmitted between the devices. For example, application 315-a at the pedestrian device 305 may include a pedestrian classification component 320 and a pseudo identifier (ID) generation component 325. At 330, application 315-a may prompt the pedestrian device 305 to transmit a P-UE packet 350 over the sidelink channel. The P-UE packet 350 may include, for example, an identifier of the pedestrian device 305, a location 360 of the pedestrian device 305, an intent indicator 365 of the pedestrian (e.g., trajectory), or any combination thereof.

In some examples, the P-UE packet 350 may include a pseudo ID 355 of the pedestrian device 305 instead of an actual identifier of the pedestrian device 305. The pseudo ID may be an identifier generated by a P-UE 115, rather than an identifier assigned to the P-UE 115 by a base station 105, wireless communications system 100, manufacturer, or the like. In some examples, using the pseudo ID 355 may be more secure for the pedestrian device 305 than using the actual identifier (e.g., RNTI, etc.). Additionally, or alternatively, the P-UE packet 350 may include, or be based on, an actual identifier for the pedestrian device 305. The pseudo ID 355 may be generated by the pseudo ID generation component 325 of application 315-a.

The location 360 may indicate the location of the pedestrian device 305. For example, the location 360 may be a Global Positioning System (GPS) value (e.g., GPS coordinates), or some other Global Navigation Satellite System (GNSS) positioning information. In some cases, the location 360 may be indicated as a relative location or indicated based on proximity.

The intent indicator 365 for the pedestrian device 305 may be determined based on one or more sensors of the pedestrian device 305. For example, the pedestrian device 305 may use different sensors to determine characteristics of the pedestrian movement such as the pedestrian's gait, speed, direction of movement, limb movement (e.g., limb swing), etc. The pedestrian device 305 may then parameterize those characteristics and sensor readings into an intent of the pedestrian device 305. For example, based on the limb movement, speed, and gait of the pedestrian, the pedestrian device 305 may determine that the pedestrian is running. Further, based on a direction of movement of the pedestrian, the pedestrian device 305 may determine its trajectory, such as, for example, that the pedestrian is running toward a street or toward a vehicle (e.g., the vehicle 310).

The pedestrian device 305 may broadcast the P-UE packet 350, which may be received by nearby vehicles. In some cases, the broadcast may be periodic. For example, the broadcast may be unconditionally periodic, or the broadcast may be conditioned to be transmitted when the UE is operating in a pedestrian mode such as walking, biking, running etc. Or, in some examples, the pedestrian device 305 may detect an event which triggers generating the P-UE packet 350, the broadcast, or both.

For example, the triggering event may be based on the cadence or gait of the pedestrian changing, the pedestrian nearing an intersection or street, the pedestrian approaching a vehicle, etc. The pedestrian device 305 may determine a travel mode of the pedestrian and determine whether the pedestrian is performing any modes of interest. For example, walking, running, or biking may be possible modes of interest. Driving a vehicle or being a passenger in a vehicle may, in some cases, not be considered a mode of interest, as vehicle-to-vehicle communications may implement their own collision detection procedures.

If the pedestrian device 305 is performing any of the modes of interest, the P-UE may be assigned a pseudo ID 355 by application 315-a (e.g., by the pseudo ID generation component 325). Application 315-a may then create the P-UE packet 350, the packet including the pseudo ID 355 as the source ID for the packet and a destination ID which indicates that the P-UE packet 350 is broadcasted (e.g., and does not have a specific, intended destination or receiving device). Application 315-a may also include other contents in the P-UE packet 350, such as the location 360 (e.g., GPS or GNSS coordinates) and the intent indicator 365 (e.g., trajectory data) to convey the determined intent of the pedestrian.

Once application 315-a generates the P-UE packet 350, the application packet at the pedestrian device 305 may be provided to a V2X layer 380 at the pedestrian device 305. For example, P-UE packet 350 may be provided to V2X layer 380-a. V2X layer 380-a may process the P-UE packet 350 and pass it along to a protocol stack 385 of the pedestrian device 305 to be processed. After protocol stack 385-a processes the P-UE packet 350, the packet may be transmitted in a broadcast transmission over the sidelink channel.

Nearby vehicles of the pedestrian device 305 may receive the broadcasted P-UE packet 350. For example, the vehicle 310 may receive the P-UE packet 350 from the pedestrian device 305, including the pseudo ID 355, the location 360, and intent indicator 365. In some examples, the vehicle 310 may receive an application packet from each of multiple pedestrian devices, where each of the application packets may include respective pseudo IDs, locations, and intent indicators.

The vehicle 310 may determine whether the pedestrian device 305 is in a collision course with the vehicle 310. For example, the vehicle 310 may determine whether the pedestrian device 305 and the vehicle 310 are on a collision course based on the location 360 and intent indicator 365 in the P-UE packet 350. In some cases, the vehicle 310 may run a collision detection algorithm based on a trajectory of the vehicle 310 and a trajectory of the pedestrian device 305. In some cases, the vehicle 310 may determine whether there is a collision possibility based on vision measurements, radar measurements, or the like. For example, using a sensor on the vehicle 310, the vehicle 310 may obtain a more accurate reading of the location of the pedestrian or pedestrian device 305, which the vehicle 310 may use to estimate a collision possibility. The vehicle 310 may similarly perform collision detection for any other pedestrian devices from which the vehicle 310 received a P-UE packet.

If the vehicle 310 determines that the vehicle 310 and the pedestrian device 305 are on a collision course, the vehicle 310 may generate a pedestrian warning at 345. The vehicle 310 may determine the source of the pseudo ID 355 of the P-UE to be paged and generate a V-UE packet 370, the V-UE packet 370 including the pseudo ID 355 of the pedestrian device 305 and a warning indicator 375. In some cases, the pseudo ID 355 may be the destination ID for the V-UE packet 370. In some cases, the V-UE packet 370 may include an identifier for the vehicle 310, such as a pseudo V-UE identifier. The warning indicator 375 may include a warning signs of a possible collision between the vehicle 310 and the pedestrian device 305.

The vehicle 310 may send the V-UE packet 370 to V2X layer 380-b, which may process the packet. The V-UE packet 370 may then be sent to protocol stack 385-b, where the packet is processed and transmitted to the pedestrian device 305 over the sidelink channel. In some cases, the V-UE packet 370 may be broadcasted, and in some cases, the V-UE packet 370 may be directionally transmitted toward the pedestrian device 305.

The pedestrian device 305 may receive the V-UE packet 370 from the vehicle 310. For example, the lower layers at the pedestrian device 305 may receive the V-UE packet 370 and forward the packet to the upper layers. The application layer at the pedestrian device 305 may check whether the packet is intended for the pedestrian device 305 or not, for example by comparing the pseudo ID 355 in the destination field of the V-UE packet 370 to the pseudo ID of the pedestrian device 305. If the packet is not intended for the pedestrian device 305 (e.g., the pseudo ID 355 in the destination field of the V-UE packet 370 does not match the pseudo ID of the pedestrian device 305), application 315-a may discard the packet. If the packet is intended for the pedestrian device 305 packet (e.g., the pseudo ID 355 in the destination field of the V-UE packet 370 matches the pseudo ID of the pedestrian device 305), then application 315-a and the pedestrian device 305 may respond to the collision warning message.

For example, the pedestrian warning device 340 may trigger an alert, which may inform the user of the possible collision. The alert may, for example, cause vibration, noise, visual cues, etc., at the pedestrian device 305. In some cases, the alert may be similar to a public warning message. The user of the pedestrian device 305 may observe the alert and take action to avoid the collision course. In some cases, the vehicle 310 may also take action to avoid the collision course. For example, the vehicle 310 may adjust its speed or trajectory to avoid colliding with the pedestrian device 305.

In some cases, the collision detection may be performed at the vehicle 310 instead of the pedestrian device 305 to preserve battery life at the pedestrian device 305. For example, the vehicle 310 may generally have a longer battery life (e.g., due to the use of an alternator, a larger battery, etc.). The frequent monitoring and calculating for collision detection in a V2P system, or a V2X system in general, may result in a significant battery drain. Therefore, instead of draining the battery of the pedestrian device 305, which is more limited, the majority of the collision detection procedure may be performed at the vehicle 310. This may result in relatively greatly increased battery life at the pedestrian device 305 while still providing safety features for the user of the pedestrian device 305.

Figure 4:
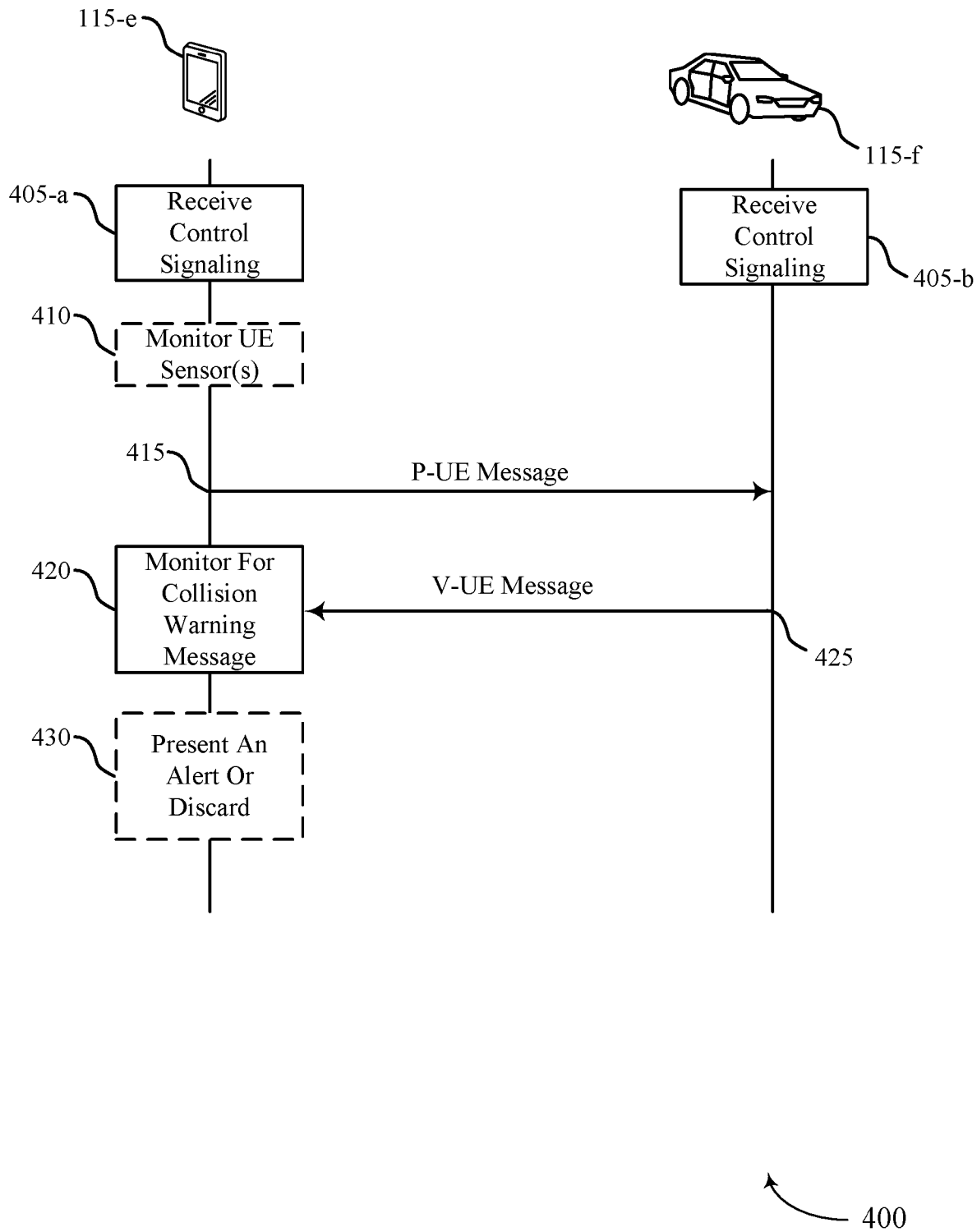
FIG. 4 illustrates an example of a process flow in accordance with aspects of the present disclosure.

FIG. 4 illustrates an example of a process flow 400 that supports sidelink based V2P system in accordance with aspects of the present disclosure. In some examples, process flow 400 may implement aspects of wireless communication system 100. The process flow 400 may include UE 115-e and UE 115-f UE 115-e may be an example of a pedestrian UE or pedestrian device, such as UEs 115-b, 115-c, and 115-d described with reference to FIG. 2. UE 115-f may be an example of a vehicle UE, such as UE 115-a described with reference to FIG. 2.

At 405, UE 115-e and UE 115-f may establish a sidelink channel for V2P communications between the devices. For example, at 405-a, UE 115-e may receive control signaling that indicates a resource allocation for a sidelink channel for pedestrian to vehicle communications. At 405-b, UE 115-f may receive control signaling that indicates a resource allocation for V2P communications. In some cases, the control signaling may be exchanged between UE 115-e and UE 115-f Additionally, or alternatively, the control signaling may come from another device, such as a base station 105.

At 410, UE 115-e may monitor at least one sensor of UE 115-e. UE 115-e may determine a movement parameter based on the monitoring. In some cases, the movement parameter may include a gait parameter, a speed parameter, a direction parameter, a limb movement parameter, or any combination thereof.

At 415, UE 115-e may transmit, within the resource allocation of the sidelink channel, a message that includes an identifier of UE 115-e based on movement data of UE 115-e being classified at pedestrian movement. UE 115-e may classify the movement data as being pedestrian movement based on the movement data corresponding to a pedestrian movement profile of a set of different movement profiles. For example, the pedestrian parameters determined at 410 may indicate that the pedestrian has a pedestrian movement profile which corresponds to walking, biking, running, etc., instead of driving a car or riding in a vehicle as a passenger, which may be other examples of movement profiles.

UE 115-f may receive, within the resource allocation for the sidelink channel, the message including the identifier of UE 115-e and location data of UE 115-e. UE 115-f may, in some cases, run a collision detection algorithm to predict whether UE 115-e and UE 115-f are on a path to collide, or a collision course. In some cases, the message may include trajectory data of UE 115-e, where the collision is predicted based on the trajectory data.

At 420, UE 115-e may monitor the sidelink channel for a collision warning message from a vehicle UE that includes the identifier of UE 115-e based on transmitting the message. At 425, UE 115-f may transmit, via the sidelink channel, a collision warning message including the identifier of UE 115-e based on a collision predicted with UE 115-e using the location data. In this example, UE 115-f may predict that UE 115-e and UE 115-f are on course to collide, so UE 115-f may transmit the collision warning message with UE 115-e's identifier.

At 430, UE 115-e may determine whether the collision warning message is intended for UE 115-e or for another device. If, for example, UE 115-e receives the collision warning message that includes the identifier of UE 115-e (e.g., that is transmitted at 425), UE 115-e may present an alert based on receiving the collision warning message. The alert may be, for example, an audible alert, a displayed alert (e.g., on a display of UE 115-e), or both. Or, in some cases, UE 115-e may receive a collision warning message, and the collision warning message may include an identifier for another UE 115 that is different from UE 115-e. If a collision warning message includes an identifier for a different UE 115, UE 115-e may discard the collision warning message. In some cases, UE 115-f may implement some pedestrian avoidance techniques. For example, UE 115-f may alter a speed of a vehicle that includes the vehicle UE, a trajectory of the vehicle, or both, based on the predicting.

Figure 5:
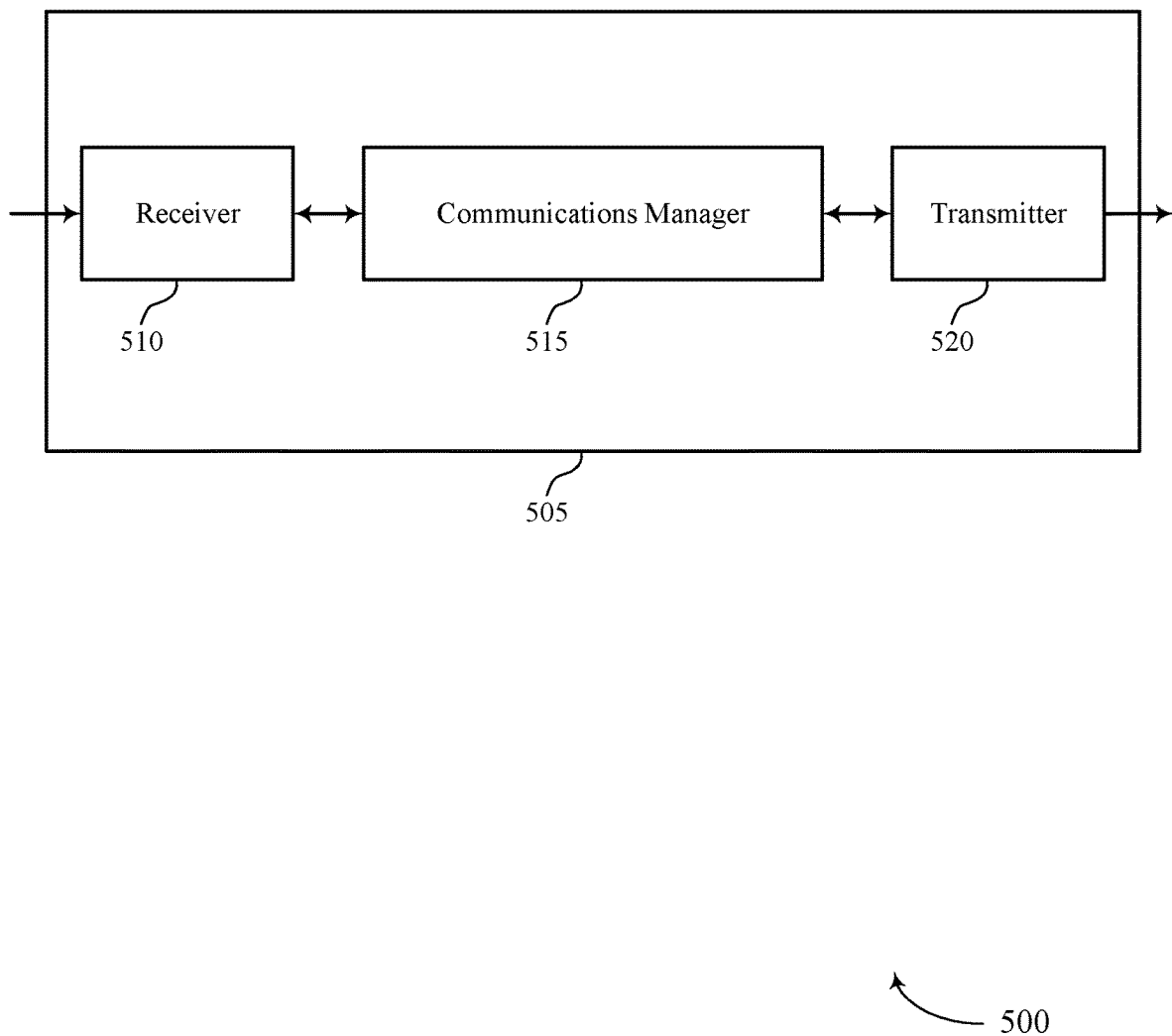
FIGS. 5 and 6 show block diagrams of devices in accordance with aspects of the present disclosure.

FIG. 5 shows a block diagram 500 of a device 505 that supports sidelink based V2P system in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink based V2P system, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive control signaling that indicates a resource allocation for a sidelink channel for pedestrian to vehicle communications, transmit, within the resource allocation of the sidelink channel, a message that includes an identifier of the UE based on movement data of the UE being classified as pedestrian movement, and monitor the sidelink channel for a collision warning message from a vehicle UE that includes the identifier of the UE based on transmitting the message.

The communications manager 515 may also receive control signaling that indicates a resource allocation for a sidelink channel for V2P communications, receive, within the resource allocation for the sidelink channel, a message that includes an identifier of a first UE and location data of the first UE, and transmit, via the sidelink channel, a collision warning message including the identifier of the first UE based on a collision predicted with the first UE using the location data. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may allow a pedestrian UE 115 to save power and increase battery life by having the vehicle (e.g., the V-UE) perform the collision detection procedures instead of the pedestrian UE 115. Additionally, or alternatively, the UE 115 may further reduce the time spent monitoring for collision detection messages by only sending a P-UE message when the UE 115 is detected to have a pedestrian movement profile. For example, the UE 115 may not send a message indicating a location, pedestrian intent, and identifier when the UE 115 is determined to be a passenger in a vehicle or operating a vehicle, so the UE 115 may only monitor for V-UE messages on the sidelink channel when the UE 115 is identified to have pedestrian movement. Therefore, these techniques may lead to power efficiency while providing road and pedestrian safety.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
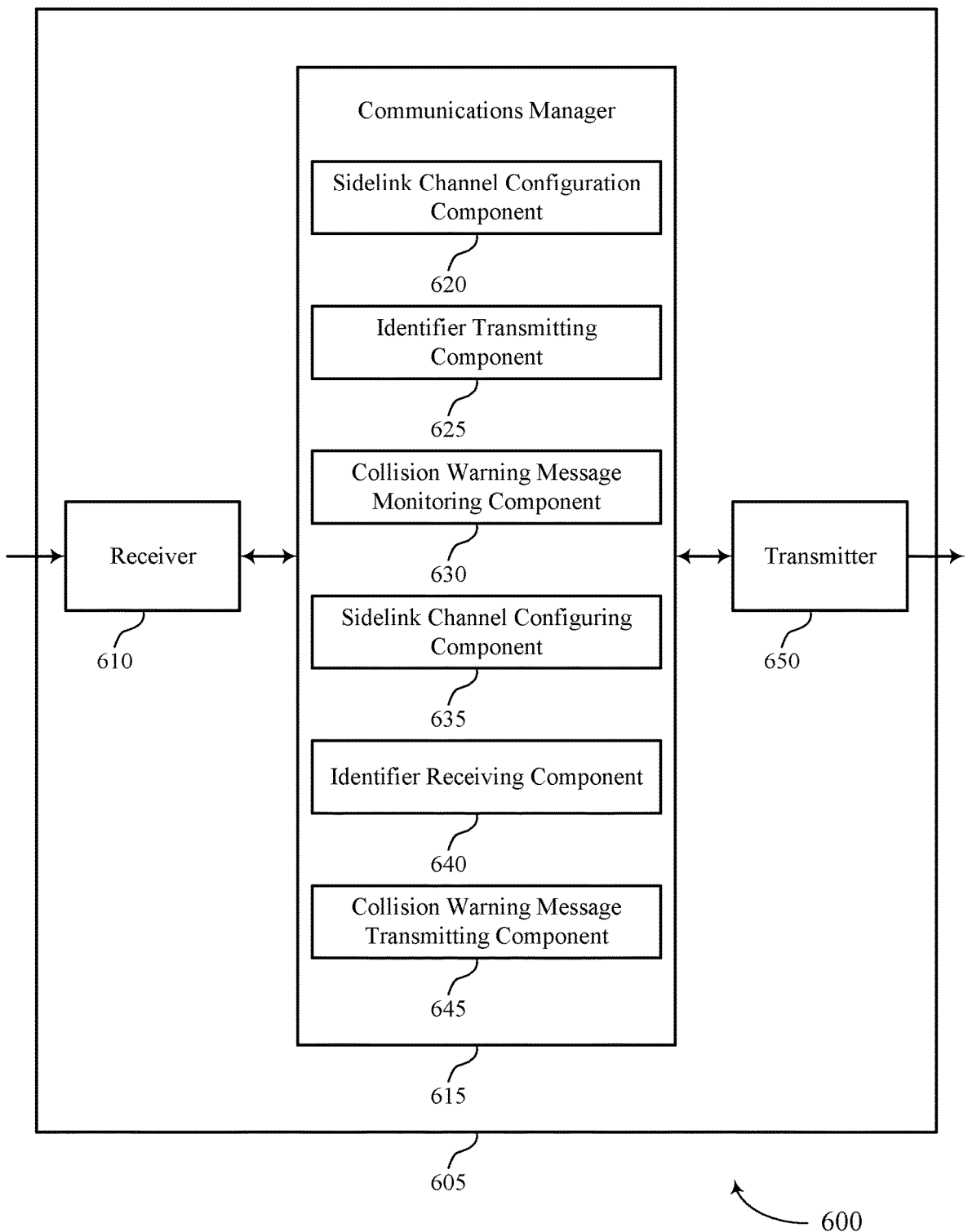

FIG. 6 shows a block diagram 600 of a device 605 that supports sidelink based V2P system in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to sidelink based V2P system, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a sidelink channel configuration component 620, an identifier transmitting component 625, a collision warning message monitoring component 630, a sidelink channel configuring component 635, an identifier receiving component 640, and a collision warning message transmitting component 645. The communications manager 615 may be an example of aspects of the communications manager 810 described herein.

The sidelink channel configuration component 620 may receive control signaling that indicates a resource allocation for a sidelink channel for pedestrian to vehicle communications. The identifier transmitting component 625 may transmit, within the resource allocation of the sidelink channel, a message that includes an identifier of the UE based on movement data of the UE being classified as pedestrian movement. The collision warning message monitoring component 630 may monitor the sidelink channel for a collision warning message from a vehicle UE that includes the identifier of the UE based on transmitting the message.

The sidelink channel configuring component 635 may receive control signaling that indicates a resource allocation for a sidelink channel for V2P communications. The identifier receiving component 640 may receive, within the resource allocation for the sidelink channel, a message that includes an identifier of a first UE and location data of the first UE. The collision warning message transmitting component 645 may transmit, via the sidelink channel, a collision warning message including the identifier of the first UE based on a collision predicted with the first UE using the location data.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

In some cases, monitoring for a V-UE message based on transmitting a P-UE message may support a processor of a UE 115 (e.g., controlling the receiver 610, the transmitter 650, or the transceiver 920 as described with reference to FIG. 9) to efficiently manage V-UE message monitoring occasions. For example, the processor of the UE 115 may power down some components which monitor the sidelink channel when the UE 115 has not transmitted a P-UE message. In addition to preserving battery life at the UE 115 due to less time spent monitoring, these techniques may increase longevity of the monitoring components.

Figure 7:
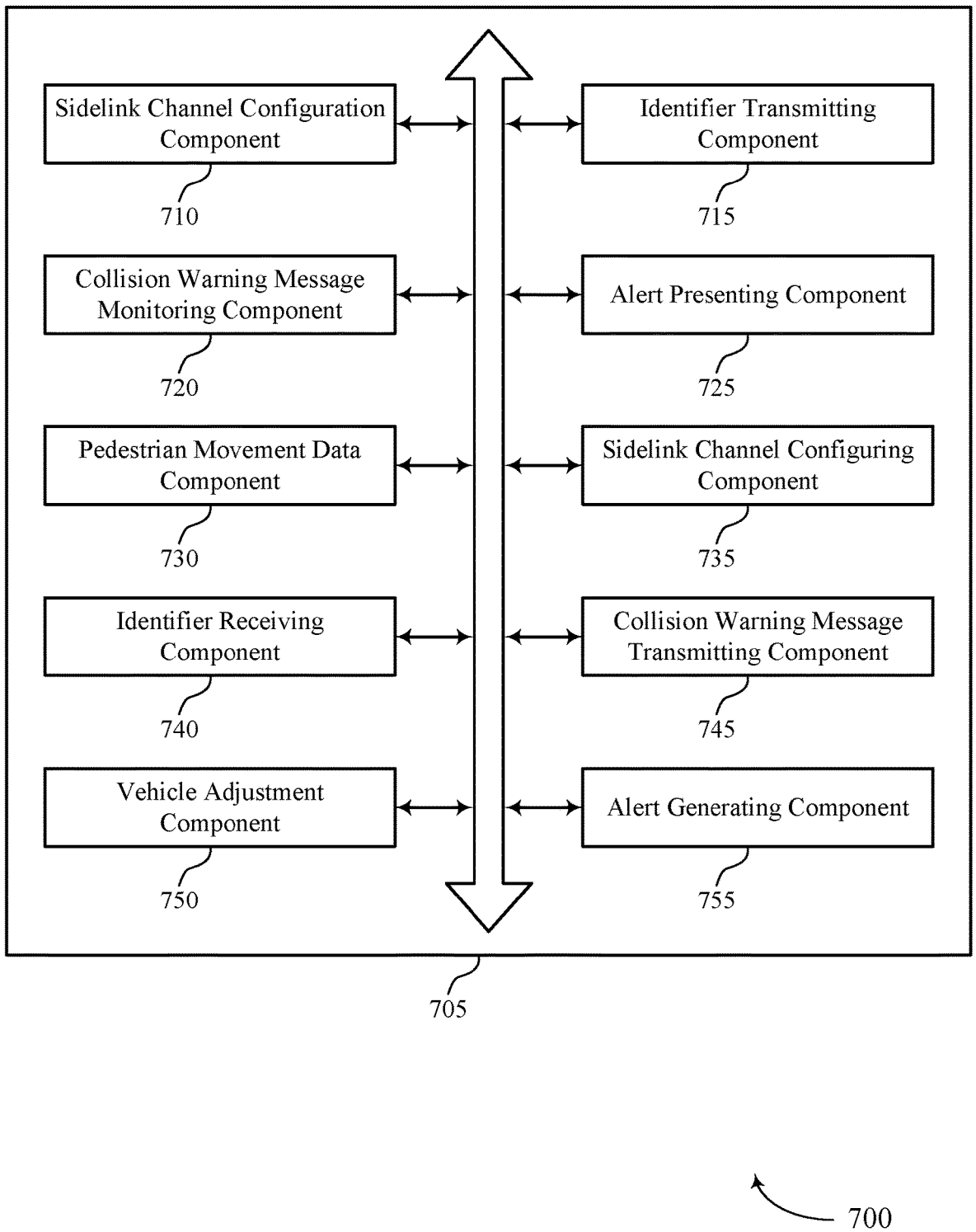
FIG. 7 shows a block diagram of a communications manager in accordance with aspects of the present disclosure.

FIG. 7 shows a block diagram 700 of a communications manager 705 that supports sidelink based V2P system in accordance with aspects of the present disclosure. The communications manager 705 may be an example of aspects of a communications manager 515, a communications manager 615, or a communications manager 810 described herein. The communications manager 705 may include a sidelink channel configuration component 710, an identifier transmitting component 715, a collision warning message monitoring component 720, an alert presenting component 725, a pedestrian movement data component 730, a sidelink channel configuring component 735, an identifier receiving component 740, a collision warning message transmitting component 745, a vehicle adjustment component 750, and an alert generating component 755. Each of these modules may communicate, directly or indirectly, with one another (e.g., via one or more buses).

The sidelink channel configuration component 710 may receive control signaling that indicates a resource allocation for a sidelink channel for pedestrian to vehicle communications. The identifier transmitting component 715 may transmit, within the resource allocation of the sidelink channel, a message that includes an identifier of the UE based on movement data of the UE being classified as pedestrian movement. In some examples, the identifier transmitting component 715 may transmit the message including location data of the UE, trajectory data of the UE, or both. In some examples, the identifier transmitting component 715 may transmit the message including the identifier that is a pseudo identifier of the UE.

In some examples, the identifier transmitting component 715 may transmit the message including a packet that includes a pseudo identifier of the UE as a source identifier of the packet, and a broadcast identifier as a destination identifier of the packet. In some examples, the identifier transmitting component 715 may transmit the message via the sidelink channel using a sidelink interface of the UE.

The collision warning message monitoring component 720 may monitor the sidelink channel for a collision warning message from a vehicle UE that includes the identifier of the UE based on transmitting the message. In some examples, the collision warning message monitoring component 720 may monitor a V2P resource pool of the sidelink channel for the collision warning message.

In some examples, the collision warning message monitoring component 720 may receive the collision warning message that includes an identifier of a second UE that is different from the UE. In some examples, the collision warning message monitoring component 720 may discard the collision warning message.

The alert presenting component 725 may receive the collision warning message that includes the identifier of the UE. In some examples, the alert presenting component 725 may present an alert based on receiving the collision warning message. In some examples, the alert presenting component 725 may determine that a second identifier included as a destination identifier in the collision warning message matches the identifier of the UE. In some cases, the alert is an audible alert, a displayed alert, or both.

The pedestrian movement data component 730 may classify the movement data as being pedestrian movement based on the movement data corresponding to a pedestrian movement profile of a set of different movement profiles. In some examples, the pedestrian movement data component 730 may monitor at least one sensor of the UE.

In some examples, the pedestrian movement data component 730 may determine a movement parameter based on the monitoring, where the movement data of the UE is classified as the pedestrian movement based on the movement parameter. In some cases, the movement parameter is a gait parameter, a speed parameter, a direction parameter, a limb movement parameter, or any combination thereof.

The sidelink channel configuring component 735 may receive control signaling that indicates a resource allocation for a sidelink channel for V2P communications.

The identifier receiving component 740 may receive, within the resource allocation for the sidelink channel, a message that includes an identifier of a first UE and location data of the first UE. In some examples, the message includes trajectory data of the first UE, where the collision is predicted based on the trajectory data.

In some examples, the identifier receiving component 740 may receive the message that includes trajectory data of the first UE, movement data of the first UE, or both, where the collision is predicted based on a gait parameter, a speed parameter, a direction parameter, a limb movement parameter, or any combination thereof.

In some examples, the identifier receiving component 740 may receive a second message that includes an identifier of a second UE and location data of the second UE. In some examples, the identifier receiving component 740 may predict that the vehicle UE is not on a collision course with the second UE based on the second message. In some examples, the identifier receiving component 740 may determine not to transmit a second collision warning message that includes the identifier of the second UE based on the predicting.

The collision warning message transmitting component 745 may transmit, via the sidelink channel, a collision warning message including the identifier of the first UE based on a collision predicted with the first UE using the location data. In some examples, the collision warning message transmitting component 745 may transmit the collision warning message including the identifier of the first UE as a destination identifier in the collision warning message. In some examples, the collision warning message transmitting component 745 may transmit the collision warning message via the sidelink channel using a sidelink interface of the vehicle UE.

The vehicle adjustment component 750 may alter a speed of a vehicle that includes the vehicle UE, a trajectory of the vehicle, or both, based on the predicting. The alert generating component 755 may generate an alert based on the predicting.

Figure 8:
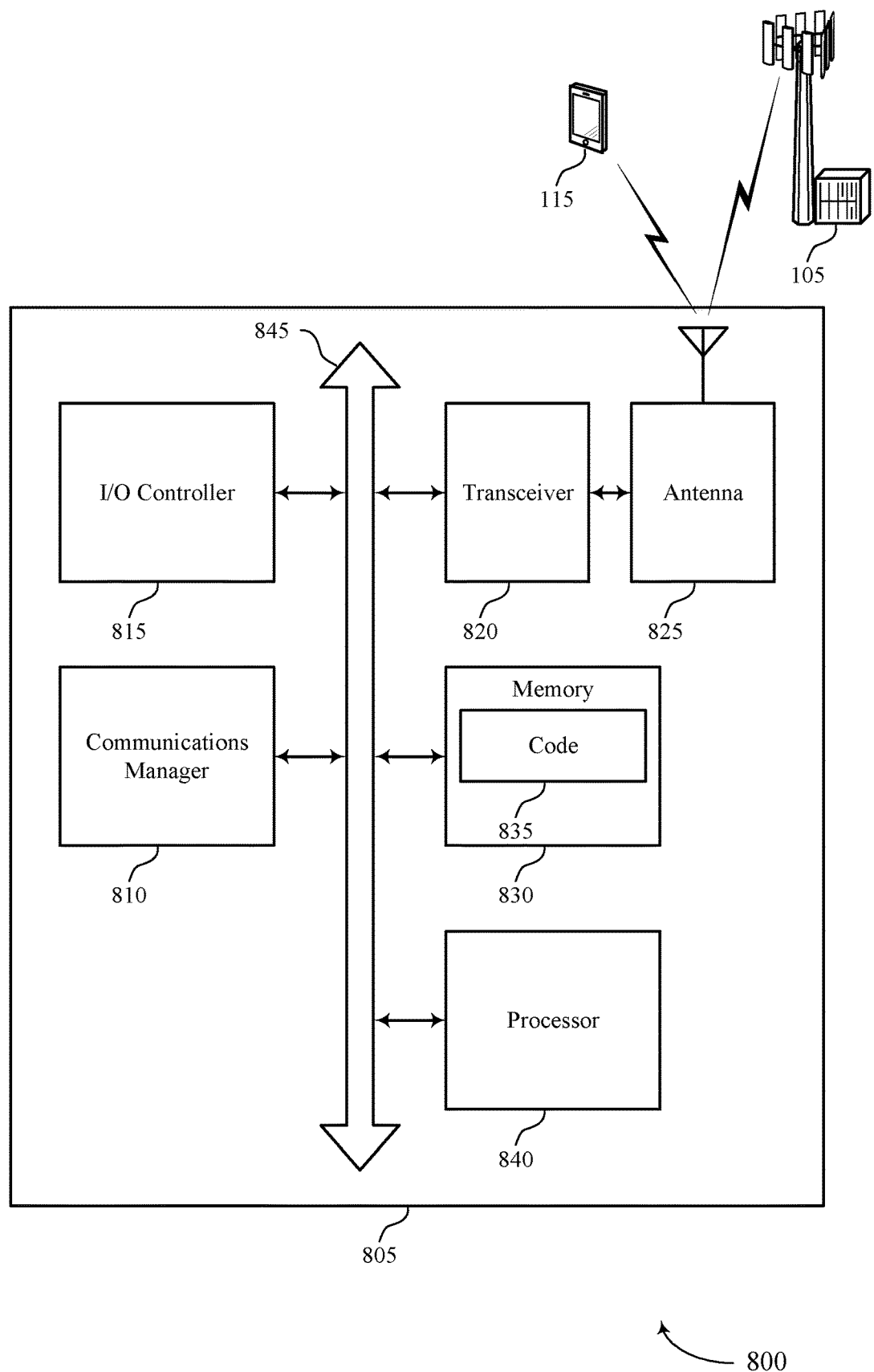
FIG. 8 shows a diagram of a system in accordance with aspects of the present disclosure.

FIG. 8 shows a diagram of a system 800 including a device 805 that supports sidelink based V2P system in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive control signaling that indicates a resource allocation for a sidelink channel for pedestrian to vehicle communications, transmit, within the resource allocation of the sidelink channel, a message that includes an identifier of the UE based on movement data of the UE being classified as pedestrian movement, and monitor the sidelink channel for a collision warning message from a vehicle UE that includes the identifier of the UE based on transmitting the message. The communications manager 810 may also receive control signaling that indicates a resource allocation for a sidelink channel for V2P communications, receive, within the resource allocation for the sidelink channel, a message that includes an identifier of a first UE and location data of the first UE, and transmit, via the sidelink channel, a collision warning message including the identifier of the first UE based on a collision predicted with the first UE using the location data.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink based V2P system).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
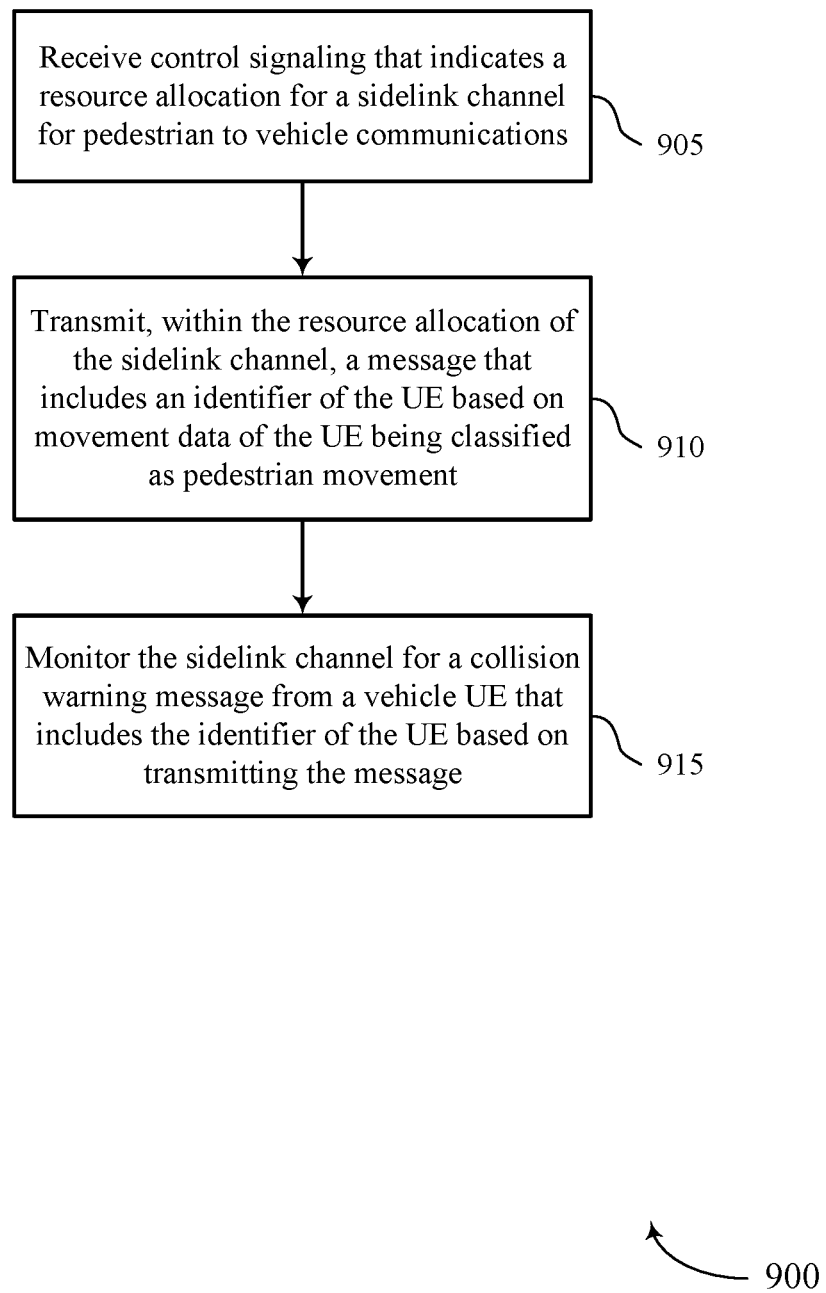
FIGS. 9 through 12 show flowcharts illustrating methods in accordance with aspects of the present disclosure.

FIG. 9 shows a flowchart illustrating a method 900 that supports sidelink based V2P system in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive control signaling that indicates a resource allocation for a sidelink channel for pedestrian to vehicle communications. The operations of 905 may be performed according to the methods described herein. In some examples, aspects of the operations of 905 may be performed by a sidelink channel configuration component as described with reference to FIGS. 5 through 8.

At 910, the UE may transmit, within the resource allocation of the sidelink channel, a message that includes an identifier of the UE based on movement data of the UE being classified as pedestrian movement. The operations of 910 may be performed according to the methods described herein. In some examples, aspects of the operations of 910 may be performed by an identifier transmitting component as described with reference to FIGS. 5 through 8.

At 915, the UE may monitor the sidelink channel for a collision warning message from a vehicle UE that includes the identifier of the UE based on transmitting the message. The operations of 915 may be performed according to the methods described herein. In some examples, aspects of the operations of 915 may be performed by a collision warning message monitoring component as described with reference to FIGS. 5 through 8.

Figure 10:
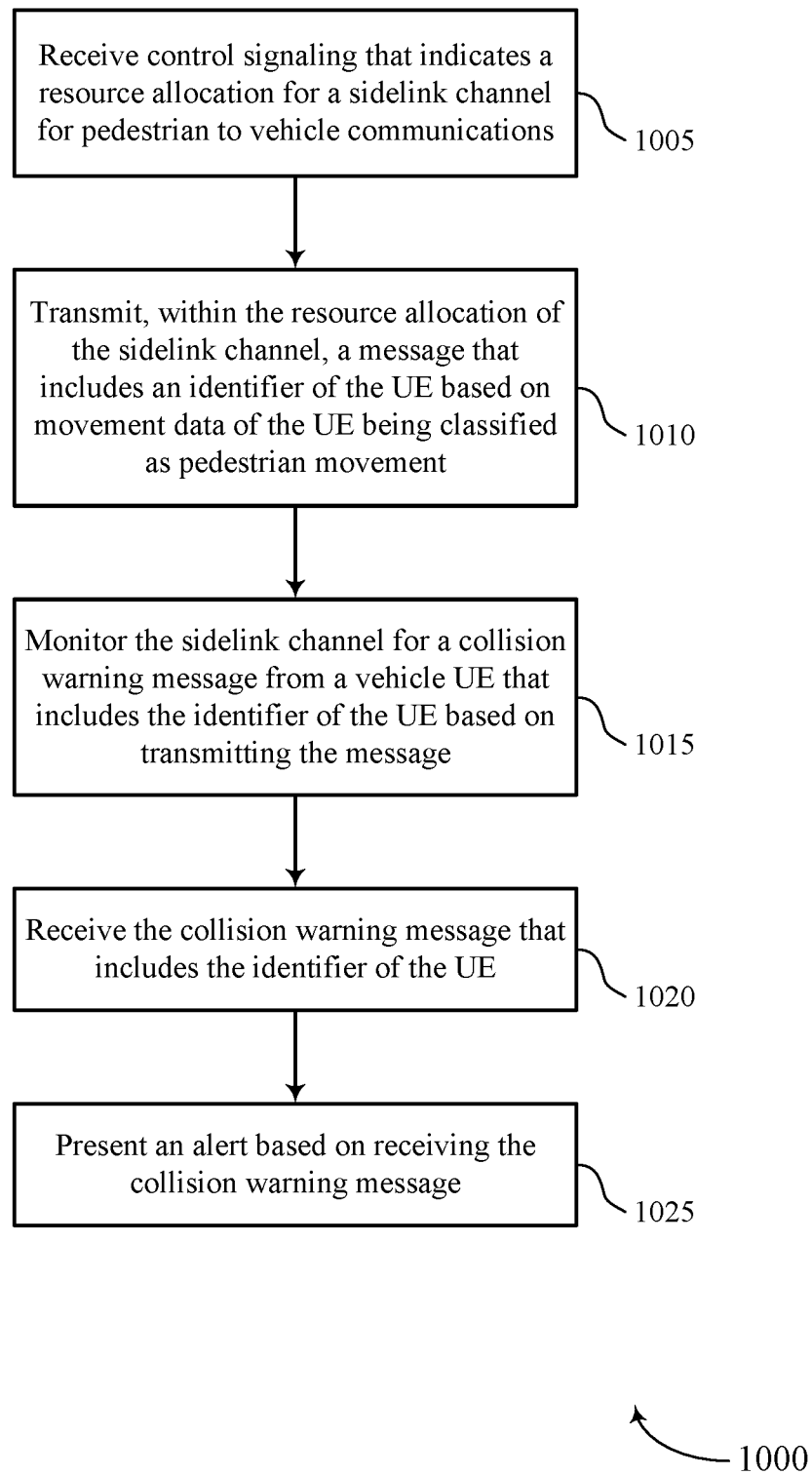

FIG. 10 shows a flowchart illustrating a method 1000 that supports sidelink based V2P system in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive control signaling that indicates a resource allocation for a sidelink channel for pedestrian to vehicle communications. The operations of 1005 may be performed according to the methods described herein. In some examples, aspects of the operations of 1005 may be performed by a sidelink channel configuration component as described with reference to FIGS. 5 through 8.

At 1010, the UE may transmit, within the resource allocation of the sidelink channel, a message that includes an identifier of the UE based on movement data of the UE being classified as pedestrian movement. The operations of 1010 may be performed according to the methods described herein. In some examples, aspects of the operations of 1010 may be performed by an identifier transmitting component as described with reference to FIGS. 5 through 8.

At 1015, the UE may monitor the sidelink channel for a collision warning message from a vehicle UE that includes the identifier of the UE based on transmitting the message. The operations of 1015 may be performed according to the methods described herein. In some examples, aspects of the operations of 1015 may be performed by a collision warning message monitoring component as described with reference to FIGS. 5 through 8.

At 1020, the UE may receive the collision warning message that includes the identifier of the UE. The operations of 1020 may be performed according to the methods described herein. In some examples, aspects of the operations of 1020 may be performed by an alert presenting component as described with reference to FIGS. 5 through 8.

At 1025, the UE may present an alert based on receiving the collision warning message. The operations of 1025 may be performed according to the methods described herein. In some examples, aspects of the operations of 1025 may be performed by an alert presenting component as described with reference to FIGS. 5 through 8.

Figure 11:
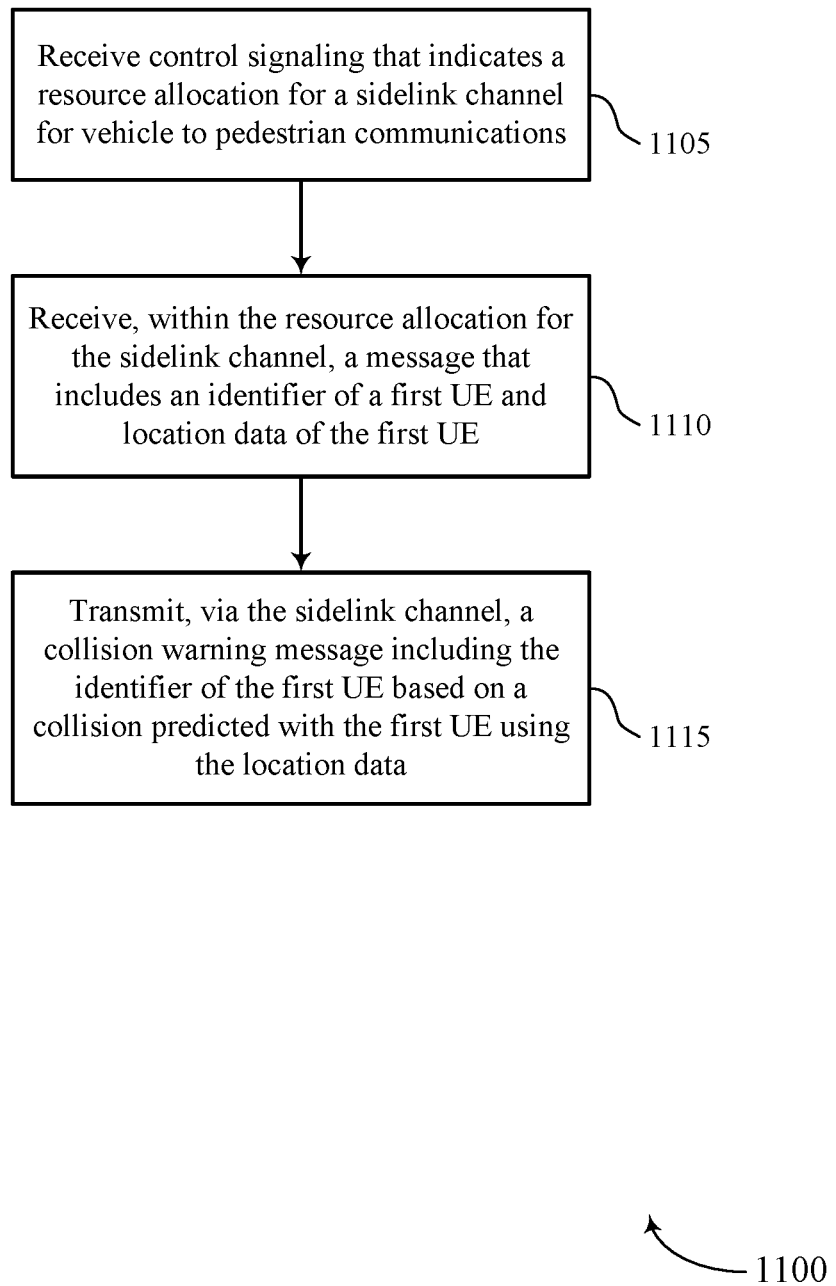

FIG. 11 shows a flowchart illustrating a method 1100 that supports sidelink based V2P system in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may receive control signaling that indicates a resource allocation for a sidelink channel for V2P communications. The operations of 1105 may be performed according to the methods described herein. In some examples, aspects of the operations of 1105 may be performed by a sidelink channel configuring component as described with reference to FIGS. 5 through 8.

At 1110, the UE may receive, within the resource allocation for the sidelink channel, a message that includes an identifier of a first UE and location data of the first UE. The operations of 1110 may be performed according to the methods described herein. In some examples, aspects of the operations of 1110 may be performed by an identifier receiving component as described with reference to FIGS. 5 through 8.

At 1115, the UE may transmit, via the sidelink channel, a collision warning message including the identifier of the first UE based on a collision predicted with the first UE using the location data. The operations of 1115 may be performed according to the methods described herein. In some examples, aspects of the operations of 1115 may be performed by a collision warning message transmitting component as described with reference to FIGS. 5 through 8.

Figure 12:
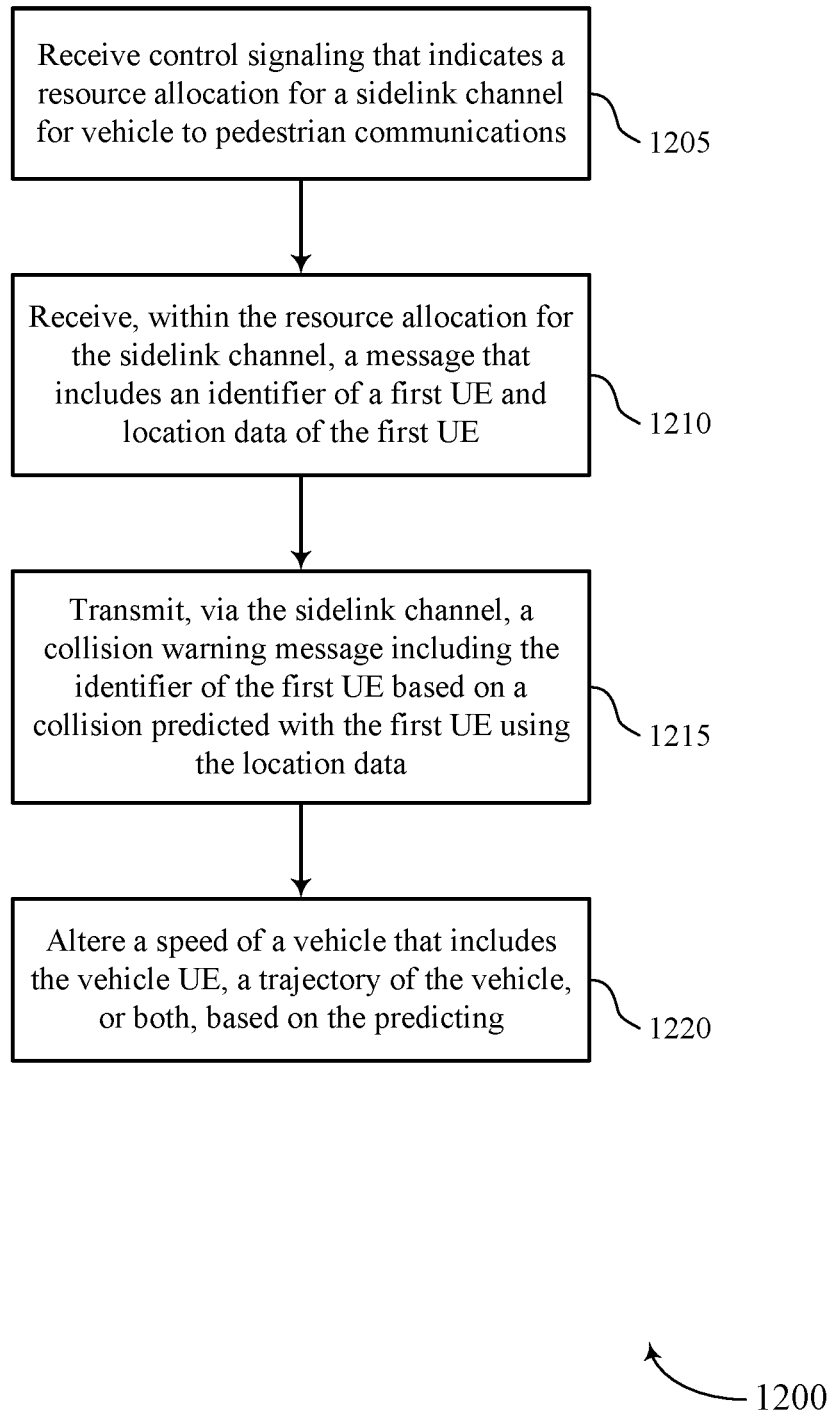

FIG. 12 shows a flowchart illustrating a method 1200 that supports sidelink based V2P system in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may receive control signaling that indicates a resource allocation for a sidelink channel for V2P communications. The operations of 1205 may be performed according to the methods described herein. In some examples, aspects of the operations of 1205 may be performed by a sidelink channel configuring component as described with reference to FIGS. 5 through 8.

At 1210, the UE may receive, within the resource allocation for the sidelink channel, a message that includes an identifier of a first UE and location data of the first UE. The operations of 1210 may be performed according to the methods described herein. In some examples, aspects of the operations of 1210 may be performed by an identifier receiving component as described with reference to FIGS. 5 through 8.

At 1215, the UE may transmit, via the sidelink channel, a collision warning message including the identifier of the first UE based on a collision predicted with the first UE using the location data. The operations of 1215 may be performed according to the methods described herein. In some examples, aspects of the operations of 1215 may be performed by a collision warning message transmitting component as described with reference to FIGS. 5 through 8.

At 1220, the UE may alter a speed of a vehicle that includes the vehicle UE, a trajectory of the vehicle, or both, based on the predicting. The operations of 1220 may be performed according to the methods described herein. In some examples, aspects of the operations of 1220 may be performed by a vehicle adjustment component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    receiving control signaling that indicates a resource allocation for a sidelink channel for pedestrian to vehicle communications;
    transmitting, within the resource allocation of the sidelink channel, a message that comprises an identifier of the UE, wherein transmitting the message is based at least in part on movement data of the UE being classified as pedestrian movement; and
    monitoring the sidelink channel for a collision warning message from a vehicle UE that comprises the identifier of the UE based at least in part on transmitting the message.

2. The method of claim 1, wherein transmitting the message comprises:
    transmitting the message comprising location data of the UE, trajectory data of the UE, or both.

3. The method of claim 1, wherein monitoring the sidelink channel comprises:
    monitoring a vehicle-to-pedestrian resource pool of the sidelink channel for the collision warning message.

4. The method of claim 1, wherein transmitting the message comprises:
    transmitting the message comprising the identifier that is a pseudo identifier of the UE.

5. The method of claim 1, wherein transmitting the message comprises:
    transmitting the message comprising a packet that includes a pseudo identifier of the UE as a source identifier of the packet, and a broadcast identifier as a destination identifier of the packet.

6. The method of claim 1, further comprising:
    receiving the collision warning message that comprises an identifier of a second UE that is different from the UE; and
    discarding the collision warning message.

7. The method of claim 1, further comprising:
    receiving the collision warning message that comprises the identifier of the UE; and presenting an alert based at least in part on receiving the collision warning message.

8. The method of claim 7, wherein the alert is an audible alert, a displayed alert, or both.

9. The method of claim 7, further comprising:
determining that a second identifier included as a destination identifier in the collision warning message matches the identifier of the UE.

10. The method of claim 1, further comprising:
classifying the movement data as being pedestrian movement based at least in part on the movement data corresponding to a pedestrian movement profile of a plurality of different movement profiles.

11. The method of claim 1, further comprising:
monitoring at least one sensor of the UE; and
determining a movement parameter based at least in part on the monitoring, wherein the movement data of the UE is classified as the pedestrian movement based at least in part on the movement parameter.

12. The method of claim 11, wherein the movement parameter is a gait parameter, a speed parameter, a direction parameter, a limb movement parameter, or any combination thereof.

13. The method of claim 1, wherein transmitting the message comprises:
transmitting the message via the sidelink channel using a sidelink PC5 interface of the UE.

14. A method for wireless communications by a vehicle user equipment (UE), comprising:
receiving control signaling that indicates a resource allocation for a sidelink channel for vehicle-to-pedestrian communications;
receiving, within the resource allocation for the sidelink channel, a message from a first UE that comprises an identifier of the first UE and location data of the first UE; and
transmitting, via the sidelink channel, a collision warning message comprising the identifier of the first UE based at least in part on a collision predicted with the first UE using the location data.

15. The method of claim 14, wherein receiving the message comprises:
receiving the message that comprises trajectory data of the first UE, wherein the collision is predicted based at least in part on the trajectory data.

16. The method of claim 14, wherein receiving the message comprises:
receiving the message that comprises trajectory data of the first UE, movement data of the first UE, or both, wherein the collision is predicted based at least in part on a gait parameter, a speed parameter, a direction parameter, a limb movement parameter, or any combination thereof.

17. The method of claim 14, wherein transmitting the collision warning message comprises:
transmitting the collision warning message comprising the identifier of the first UE as a destination identifier in the collision warning message.

18. The method of claim 14, wherein transmitting the collision warning message comprises:
transmitting the collision warning message via the sidelink channel using a sidelink PC5 interface of the vehicle UE.

19. The method of claim 14, further comprising:
altering a speed of a vehicle that includes the vehicle UE, a trajectory of the vehicle, or both, based at least in part on the predicting.

20. The method of claim 14, further comprising:
generating an alert based at least in part on the predicting.

21. The method of claim 14, further comprising:
receiving a second message that comprises an identifier of a second UE and location data of the second UE;
predicting that the vehicle UE is not on a collision course with the second UE based at least in part on the second message; and
determining not to transmit a second collision warning message that comprises the identifier of the second UE based at least in part on the predicting.

22. An apparatus for wireless communications by a user equipment (UE), comprising: a processor, memory coupled with the processor; and instructions stored in the memory and executable by the processor to cause the apparatus to:
receive control signaling that indicates a resource allocation for a sidelink channel for pedestrian to vehicle communications;
transmit, within the resource allocation of the sidelink channel, a message that comprises an identifier of the UE, wherein the message is transmitted based at least in part on movement data of the UE being classified as pedestrian movement; and
monitor the sidelink channel for a collision warning message from a vehicle UE that comprises the identifier of the UE based at least in part on transmitting the message.

23. The apparatus of claim 22, further comprising a transmitter, wherein the instructions to transmit the message are executable by the processor to cause the apparatus to:
transmit, via the transmitter, the message comprising location data of the UE, trajectory data of the UE, or both.

24. The apparatus of claim 22, wherein the instructions to monitor the sidelink channel are executable by the processor to cause the apparatus to:
monitor a vehicle-to-pedestrian resource pool of the sidelink channel for the collision warning message.

25. The apparatus of claim 22, wherein the instructions to transmit the message are executable by the processor to cause the apparatus to:
transmit the message comprising the identifier that is a pseudo identifier of the UE.

26. The apparatus of claim 22, wherein the instructions to transmit the message are executable by the processor to cause the apparatus to:
transmit the message comprising a packet that includes a pseudo identifier of the UE as a source identifier of the packet, and a broadcast identifier as a destination identifier of the packet.

27. The apparatus of claim 22, wherein the instructions are further executable by the processor to cause the apparatus to:
receive the collision warning message that comprises an identifier of a second UE that is different from the UE; and
discard the collision warning message.

28. The apparatus of claim 22, wherein the instructions are further executable by the processor to cause the apparatus to:
receive the collision warning message that comprises the identifier of the UE; and
present an alert based at least in part on receiving the collision warning message.

29. An apparatus for wireless communications by a vehicle user equipment (UE), comprising: a processor, memory coupled with the processor; and instructions stored in the memory and executable by the processor to cause the apparatus to:

receive control signaling that indicates a resource allocation for a sidelink channel for vehicle-to-pedestrian communications;

receive, within the resource allocation for the sidelink channel, a message from a first UE that comprises an identifier of the first UE and location data of the first UE; and transmit, via the sidelink channel, a collision warning message comprising the identifier of the first UE based at least in part on a collision predicted with the first UE using the location data.

30. The apparatus of claim 29, further comprising a receiver, wherein the instructions to receive the message are executable by the processor to cause the apparatus to:

receive, via the receiver, the message that comprises trajectory data of the first UE, wherein the collision is predicted based at least in part on the trajectory data.

* * * * *